United States Patent [19]

Hassett

[11] Patent Number: 5,751,973
[45] Date of Patent: May 12, 1998

[54] ELECTRONIC PARKING AND DISPATCHING MANAGEMENT METHOD AND APPARATUS

[75] Inventor: John J. Hassett, Marblehead, Mass.

[73] Assignee: AT/COMM Incorporated, Marblehead, Mass.

[21] Appl. No.: 945,523

[22] Filed: Sep. 16, 1992

Related U.S. Application Data

[63] Continuation-in-part of Ser. No. 901,278, Jun. 19, 1992, which is a continuation-in-part of Ser. No. 525,103, May 17, 1990, Pat. No. 5,144,553.

[51] Int. Cl.$^6$ .................................................. G06F 13/00
[52] U.S. Cl. ............................................................ 395/213
[58] Field of Search ........................... 364/400, 401, 364/406, 424.02; 235/384, 382, 382.5; 340/825.31, 825.32, 928

[56] References Cited

U.S. PATENT DOCUMENTS

| | | | |
|---|---|---|---|
| 3,602,881 | 8/1971 | Bayne | 340/31 |
| 4,031,513 | 6/1977 | Simciak | 340/152 |
| 4,104,630 | 8/1978 | Chasek | 343/6.5 R |
| 4,207,468 | 6/1980 | Wilson | 250/341 |
| 4,303,904 | 12/1981 | Chasek | 340/23 |
| 4,338,587 | 7/1982 | Chiappetti | 340/32 |
| 4,481,428 | 11/1984 | Charlot, Jr. | 307/219.1 |
| 4,501,958 | 2/1985 | Glize et al. | 235/382 |
| 4,555,618 | 11/1985 | Riskin | 235/384 |
| 4,786,903 | 11/1988 | Grindahl et al. | 340/825.54 |
| 4,916,296 | 4/1990 | Streck | 235/454 |
| 4,977,501 | 12/1990 | Lefevre | 364/401 |
| 5,122,959 | 6/1992 | Nathanson et al. | 364/436 |
| 5,177,685 | 1/1993 | Davis et al. | 364/443 |
| 5,206,643 | 4/1993 | Eckelt | 340/932.2 |

FOREIGN PATENT DOCUMENTS

| | | |
|---|---|---|
| 58-222369 | 12/1983 | Japan. |
| 159526 | 7/1987 | Japan. |
| 63-288399 | 11/1988 | Japan. |
| 1-259484 | 10/1989 | Japan. |
| 2-194495 | 10/1990 | Japan. |

OTHER PUBLICATIONS

Desmond, "Toll Both Net Automates Fare Collection Saves Cash", Network World, vol. 6, No. 23, pp. 4–6.
Encyclopedia of Computer Science and Engineering, Van Norstrand Reinhold Company, Inc., 1983, pp. 563–565.

Primary Examiner—Gail O. Hayes
Assistant Examiner—David Huntley
Attorney, Agent, or Firm—Lahive & Cockfield, LLP

[57] ABSTRACT

Method and apparatus for the automatic management of vehicle access to a restricted access area. The system includes at least one base transceiver positioned at least at one location providing an entrance to and an exit from said restricted access area. The system also includes a plurality of vehicle borne transponders, and an independent management computer. As vehicles attempt to access the restricted area, the base transceiver, the vehicle transponders, and the independent management computer communicate to monitor and regulate the vehicle access. According to one embodiment, the invention automatically manages access to a commercial parking facility. In another embodiment, the invention automatically dispatches taxicabs from a corral area. In a further embodiment, the invention controls vehicle access to facilities such as gated communities, and employee and student parking areas.

15 Claims, 6 Drawing Sheets

ELECTRONIC PARKING AND DISPATCHING MANAGEMENT METHOD AND APPARATUS

REFERENCE TO RELATED PATENTS

The subject matter of this application is related to that disclosed in U.S. Pat. No. 5,086,389 entitled Automatic Toll Processing Apparatus and is a continuation-in-part of U.S. patent application Ser. No. 901,278, filed Jun. 19, 1992 entitled Traffic Monitoring and Management Method and Apparatus, which is itself a continuation-in-part of U.S. patent application Ser. No. 525,103, filed May 17, 1990 now U.S. Pat. No. 5,144,553, entitled Electronic Vehicle Toll Collection System and Method. The above cited patents and patent application are assigned to the assignee of the present application, and are incorporated herein by reference.

BACKGROUND OF THE INVENTION

The present invention relates generally to systems for monitoring and managing vehicle flow through a restricted access area. More particularly, it relates to apparatus and method for utilizing a two-way radio transceiver to automatically monitor and manage vehicle entrance to, and exit from, a restricted access area by automatically obtaining information from vehicles entering the area, communicating information to vehicle operators entering the area, and by collecting any required facility usage fees from those vehicles exiting the area.

There are a variety of situations where it is desirable to regulate vehicles entering and exiting a restricted area. One situation arises when only certain authorized vehicles are permitted access to an area, such as military installations, gated housing developments, and student or employee parking lots. Another need arises in the operation of commercial parking facilities. A further need arises in the dispatching of taxicabs from a central corral area at an airport. In prior art systems, attendants monitor vehicles entering and exiting the restricted access areas, and in some instances collect fees from vehicle operators for entering and remaining in the area.

By way of example, the systems presently employed for monitoring the use of commercial parking facilities are relatively unsophisticated. Typically, prior art systems require the operator of a vehicle, upon entering a parking facility, to take a time encoded ticket from either an automated parking ticket dispenser or from an attendant monitoring the entrance to the facility. The prior art systems also generally require one or more attendants to be stationed at the exit location to collect a fee for parking in the facility. Fee calculations are most often based on the time that a vehicle remains parked in the facility. According to some prior art systems, the exit attendant performs the fee calculation with the aid of a time clock that imprints an exit time on the back of the surrendered parking ticket. Alternatively, some prior art systems issue magnetically encoded tickets upon entering the parking facility. In the case of those systems, a data processor automatically calculates the parking fee, after the attendant inserts the magnetically encoded parking ticket into a ticket reader.

Both of the above described systems suffer from several drawbacks. One such drawback is that they require one or more attendants to monitor the parking facility exit. Another drawback is that vehicle operators sometimes lose their parking tickets. In some instances, this results in the vehicle operator having to pay a preset maximum fee. An additional limitation is that prior art systems do not provide an automated mechanism for detecting vehicles abandoned in the facility.

Prior art systems for dispatching taxicabs from a queuing corral, such as those located at airports, are equally unsophisticated. Generally, an attendant manually records the order in which taxicabs enter the corral, and then dispatches the taxicabs in a first-in first-out manner. The corral attendant typically gives each dispatched taxicab operator a ticket to indicate that the taxicab was properly dispatched from the corral.

This system, like the prior art parking facility management systems, suffers from drawbacks. One drawback is that it requires an attendant to be present at the entrance and exit to the corral. An additional drawback is that the system is susceptible to errors by the attendant, with regard to logging the correct order in which taxicabs enter the corral.

Accordingly, an object of the present invention is to provide an automated management system that reduces the number of persons required to monitor vehicles entering and exiting from an access restricted area.

A further object is to provide a system for automatically tracking the order in which particular vehicles enter and exit an access restricted area.

Another object of the invention is to provide a parking facility management system for automatically calculating the appropriate parking fee, and for automatically collecting that fee from the vehicle operator without any human interface.

An additional object of the invention is to provide a system for automatically dispatching taxicabs from a corral area.

Other general and specific objects of the invention will in part be obvious and will in part appear hereinafter.

SUMMARY OF THE INVENTION

The present invention includes an apparatus and method for monitoring and managing vehicle access to a restricted access area. Such restricted access areas can include, by way of example, commercial parking facilities, gated communities, military installations, employee and student parking areas, and taxicab dispatching corrals. The invention includes a base transceiver unit, a vehicle borne transponder unit, and a central management computer.

The base transceiver unit includes elements for transmitting and receiving radio frequency signals to and from the vehicle borne transponder. It may communicate with the central management computer either by radio frequency signals or other means, such as direct wire connection. Vehicles requiring access to the restricted access area are each equipped with a vehicle transponder unit. The vehicle transponder includes a radio frequency vehicle receiver and transmitter, a vehicle memory, and a vehicle data processor. The vehicle memory can store information, received by the transponder from the base transceiver, such as time and date information, fee schedules, and instructions as to where the vehicle operator should park the vehicle. The vehicle transmitter can send to the base transceiver information, such as the vehicle identification code, the number of available parking credits, and the estimated duration of stay in the restricted access area. The base transceiver can in turn transmit this information to the independent data processor. The system can also include an electronically controlled gating system to block vehicles from entering or exiting the restricted access area.

According to one embodiment of the invention, a system is provided for managing vehicle usage of a commercial parking garage. According to this aspect of the invention, at least one base transceiver is positioned at one location having an entrance to and exit from the parking area. The transceiver includes a transmitter portion for transmitting radio frequency signals toward vehicles, entering, exiting, and located inside of the parking area. Those signals can include, by way of example, information signals representing a current date and time, a fee schedule, a request for monetary quantity available, a request for estimated length of stay, or a request for vehicle identification code. According to this embodiment, the vehicle memory may also store digital signals, indicative of available credits to pay any parking fees.

Operationally, prior to entering the parking area, the base transceiver communicates the fee schedule to the vehicle transponder. The transponder, in response can communicate the fee schedule to the vehicle operator, via a liquid crystal display on the transponder. Prior to signaling a gate to open to enable the vehicle to enter the parking area, the base transceiver signals the vehicle transponder to transmit an identification code, and a signal indicative of parking credits that the transponder has available in its account to pay the parking fees.

While utilizing the parking facility, the transponder automatically debits its parking credits account, in accord with the received fee schedule and the elapsed time since the vehicle entered the parking area. Also, while the vehicle is parked in the facility, the central management computer can interrogate the vehicle transponder, by way of the base transceiver. Through this interrogation, the central management computer can detect vehicles which possess insufficient parking credits to remain parked in the facility. In response to such a detection, the central management computer can alert a facility attendant to take appropriate action.

Upon exiting the parking facility, the vehicle transponder performs a final debit of its internal parking credits account, and also communicates its identification code to the central management computer. In response, the central management computer updates an inventory of vehicles remaining in the facility.

In another embodiment, the invention provides a system for regulating vehicle access to a restricted access area, such as a gated community, a military installation, or an employee or student parking lot. In a similar fashion to the commercial parking area, at least one base transceiver is located at an exit/entrance point to the restricted area. Vehicles utilizing the area each include transponders. Additionally, a central management computer monitors vehicles that enter and exit the area. The central management computer includes a memory for storing the identification codes of vehicles authorized to enter the area. Prior to signaling a gate to open to allow a vehicle to enter the area, the central management computer compares a vehicle identification code, obtained from the vehicle transponder by way of the base transceiver, to a list of those vehicles authorized to enter the restricted access area. If the vehicle code appears on the list, the central management computer signals the gate to open, enabling the vehicle to pass.

According to a further embodiment, the invention provides a system for dispatching taxicabs, from a corral area, to various remote locations. According to the invention, taxicabs entering the corral include vehicle transponder units. Upon entering the corral, the vehicle transponder unit communicates an identification code to a base transceiver, located at the corral entrance/exit. The base transceiver, in turn, communicates this code to a central management computer. The central management computer tracks the order in which the taxicabs enter the corral, and dispatches the taxicabs to remote locations in response to external requests. The central management computer dispatches the taxicabs based on a first-in first-out priority system. The vehicle transponders include visual displays and audio interfaces for communicating to the vehicle operator the location to which the taxicab has been dispatched. The vehicle transponder also includes an indication light, to signal an attendant at the remote location that the taxicab has been dispatched from the corral.

BRIEF DESCRIPTION OF THE DRAWINGS

For a fuller understanding of the nature and objects of the invention, reference should be made to the following detailed description and the accompanying drawings in which.

DETAILED DESCRIPTION

Figure 1:
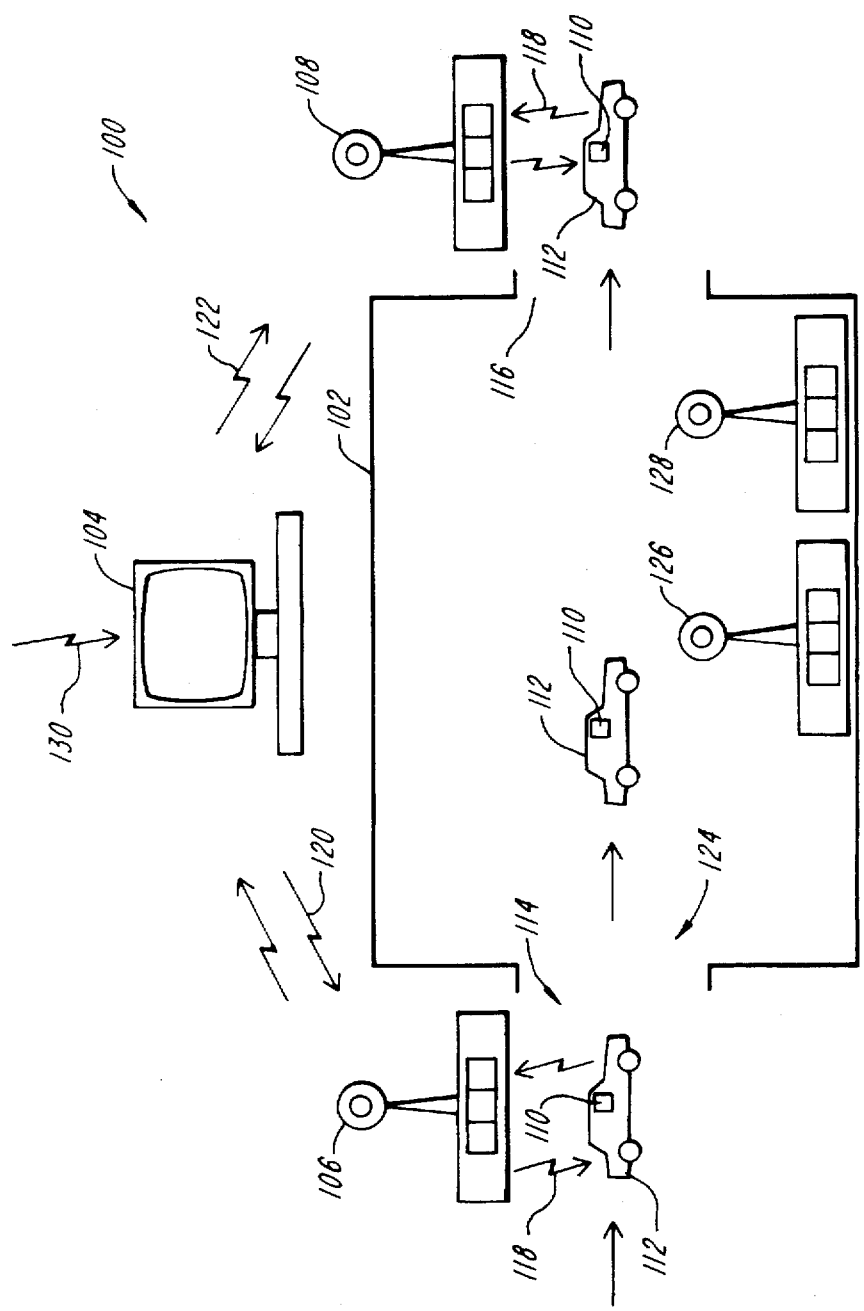
FIG. 1 is a schematic block diagram of a parking facility monitoring and management system according to the invention.

FIG. 1 is a functional block diagram of a system 100 according to the invention, particularly adapted for monitoring and managing a parking facility 102. The illustrated embodiment 100 includes three primary components; a central management computer 104, entrance and exit transceivers 106 and 108, and a vehicle transponder 110. The central management computer 104 is in radio communication with the entrance transceiver 104 and with the exit transceiver 106. Each vehicle 112, utilizing the parking facility 102, carries a transponder 110. The vehicle transponder 110 and the transceiver units 106 and 108 communicate over a bidirectional radio frequency channel 118. The central management computer 104 communicates with the transceiver unit 106 by way of a bidirectional radio frequency channel 120. Similarly, the central management computer 104 communicates with the transceiver 108 by way of the bidirectional radio frequency channel 122. According to other embodiments, the transceivers 106 and 108 communicate with the central management computer 104 over a hardwired communications interface.

As discussed in further detail below, the vehicle transponder 110, according to a preferred embodiment, includes a radio frequency transmitter and receiver, a data processor, memory, an audio interface, and a visual display. The data processor may be a standard microprocessor chip, or may consist of or include one or more integrated circuits, microchips or other processing components, which may, moreover, be included in distinct devices or separate assemblies. For example, a so-called smart card carrying a microchip may interface with other circuit components to transfer data or instructions to or from the vehicle transponder 110.

The vehicle transponder can store and process various information signals, received from transceivers 106 and 108, and transmit to those transceivers information relating to a vehicle's use of the parking facility 102. The vehicle transponder 110 can also receive relevant parking information from the central management computer 104, via the base transceivers 106 and 108, and relay that information to the vehicle operators by way of each transponder's audio interface and visual display.

Each transceiver unit 106 and 108 includes a radio frequency transmitter, a radio frequency receiver, a microprocessor, and a memory. Base transceiver 106 is situated at the entrance 114 to the parking facility 102, while base transceiver 108 is situated at the exit 116. According to one embodiment, the base transceivers 106 and 108 are located adjacent to the entrance and exit, respectively. In other embodiments, the base transceivers 106 and 108 can be located over the entrance and exit lanes. The base transceivers 106 and 108 can also be located under ground.

The base transceiver units 106 and 108 signal the vehicle transponder 110 to store, process, and transmit various information pertaining to the host vehicle's use of the parking facility 102. The transceiver units 106 and 108 also relay communications between the central management computer 104 and the vehicle transponder 110.

The central management computer 104 processes information received from the base transceivers 106 and 108, and relays various relevant parking information to the vehicle operators, by way of the base transceivers 106 and 108 and the vehicle transponder 110.

Figure 2:
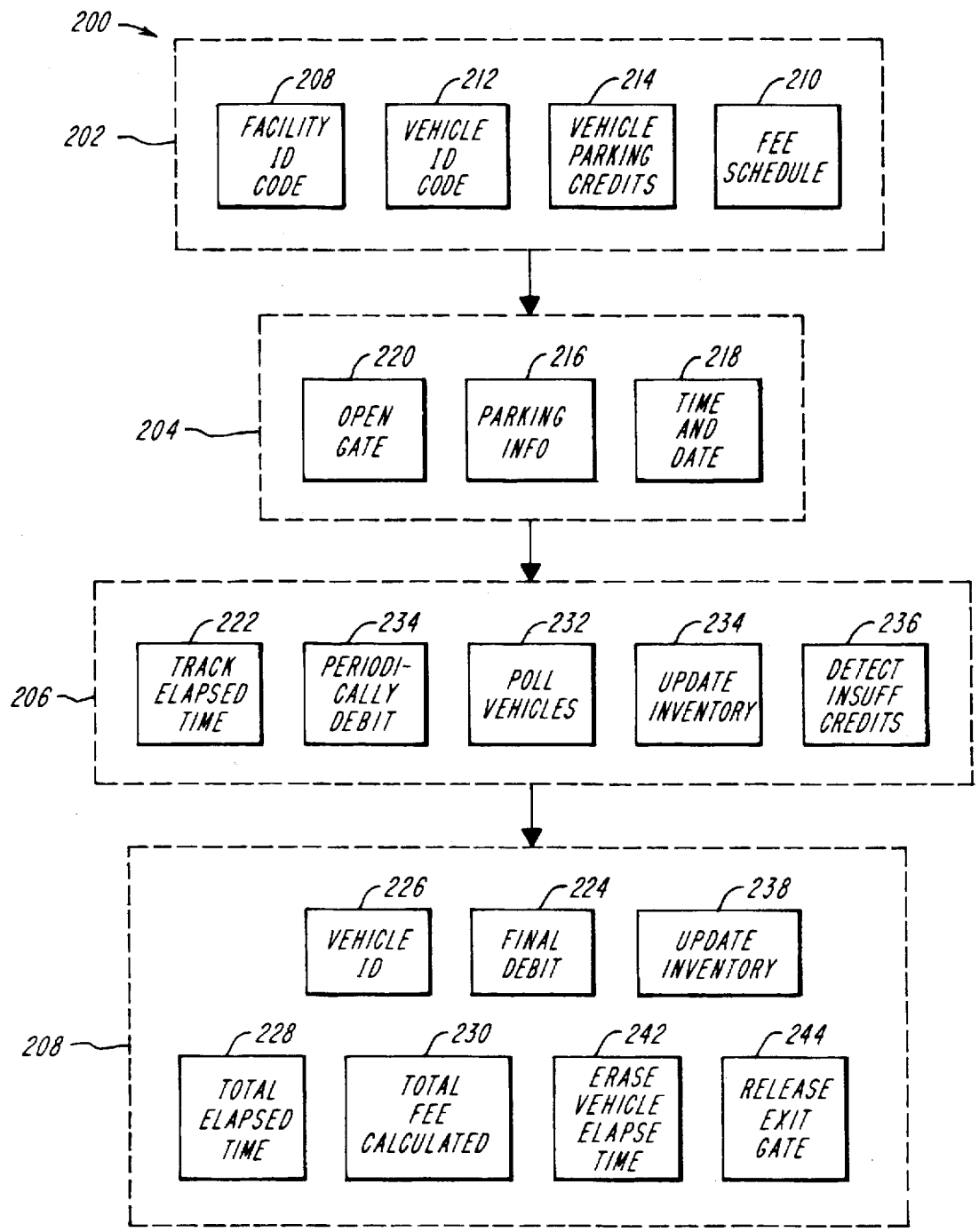
FIG. 2 shows a flow diagram depicting the operation of the system of FIG. 1.

FIG. 2 shows an operational flow diagram of the parking monitoring and management system of FIG. 1. As depicted in FIG. 2, communication between the vehicle transponder 110, the central management computer 104, and the base transceivers 106 and 108 occurs at four discrete times. A first group of communications 202 occurs prior to the vehicle 112 entering the parking facility 120. A second group 204 occurs as the vehicle 112 enters the facility 102. A third group 206 occurs while the vehicle 112 is parked in the facility 102, and a fourth group 208 occurs as the vehicle 112 exits the facility 102.

Referring to FIGS. 1 and 2, generally, a vehicle 112 approaches the parking facility 102. As the vehicle borne transponder 110 enters the radio field radiated by the transmitter portion of the entrance transceiver 106, it decodes information packets transmitted to it by the entrance transceiver 106. The information packets can be of variable length and can include information relevant to using the particular parking facility 102. The information packets can also include requests for information from the vehicle transponder 110. Information, relevant to using the particular facility 102, can include, for example, a unique digital code identifying the particular parking facility 102, as shown at 208, or parking fee schedules, as depicted at 210. Information, requested from vehicle transponder 110, can include requests for the vehicle transponder's unique identification code, as indicated at 212, or the number of parking credits that the transponder 110 has available for the uniquely identified parking facility 102, as depicted at 214. The internal memory of the vehicle transponder 110 stores a digital signal indicative of the number of available parking credits. According to one embodiment of the invention, the memory can store a plurality of parking credit accounts, each for a different parking facility.

According to one embodiment, the entrance transceiver unit 106 determines whether the vehicle transponder 110 contains a sufficient number of parking credits to gain entrance to the parking facility 102. According to another embodiment, the entrance transceiver unit 106 transmits the credit information, retrieved from the transponder 110, to the central management computer 104, and the computer 104 makes this determination.

Following a determination that the transponder 110 contains insufficient parking credits, the entrance transceiver 106 signals the vehicle operator, by way of the transponder audio interface or by way of the transponder visual display, that the vehicle cannot enter the facility 102.

Vehicle operators, can purchase additional parking credits from the manager of the facility 102. In response to a command by the facility manager, the central management computer 104 can program credits into a vehicle transponder 110, either by way of the base transceivers 106 and 108, or by way of a remotely located dedicated transceiver (not shown). Additionally, according to one embodiment, vehicle operators can interrogate their associated transponder 110, by way of a key-pad interface, to determine the available parking credits. The transponder 110, responds to the operator's request by displaying the parking credit information on the transponder's visual display.

As indicated at 218 and 220, following a determination that the vehicle transponder 110 contains sufficient parking credits, the entrance transceiver 106 transmits packets containing the current time and date, and signals the entrance gate 124 to open to enable the vehicle 112 to enter the facility 102.

As the vehicle 112 enters the facility 102, the central management computer 104 can direct the vehicle operator where to park, by way of the entrance transceiver 106. This is depicted by block 216. According to one embodiment, the central management computer 104 performs this direction in response to a parking attendant signaling the computer 104, via communication interface 130, that particular parking spaces are unoccupied.

Alternately, according to another embodiment, the vehicle operator can input into the vehicle transponder 110, by way of the key-pad interface, information such as how long the operator expects to park the vehicle 112 in the facility 102. The vehicle transponder 110 can transmit this information to the central management computer 104, by way of the entrance transceiver 106. In response to receiving this information, the central management computer 104 directs the vehicle operator, by way of the transponder visual display or by way of the transponder audio interface, to park in a particular portion of the facility 102. This feature enables the central management computer 104 to separate relatively short term parking from relatively long term parking.

Once parked in the facility 102, as depicted at 222, the vehicle transponder 110 tracks the elapsed time since entering the facility 102. As illustrated at 234, the vehicle transponder utilizes the elapsed time to periodically debit its internally stored parking credit account in accordance with the rate schedule information received from the entrance transceiver 106. Alternatively, the computations can be carried out at only the end of the parking period in response to a signal from the exit transceiver 108 and the credit account debited at that time. The vehicle transponder processor is capable of taking into account any parking rate reductions that occur, for instance due to parking in the facility for a minimum elapsed time.

When exiting the parking facility 102, the vehicle 112 passes the exit transceiver 108. This activity is represented in FIG. 2 in the group of communications expressed at 208. As the vehicle borne transponder 110 enters the radio field radiated by the transmitter portion of the exit transceiver 108, it decodes information packets transmitted to it by that transceiver. As shown at 224, those information packets can include, for example, a signal to the transponder 110 to execute a final debit from its internal parking credit account. That information packet can also include a a request for the unique vehicle identification code, a request for the elapsed time since the vehicle entered the facility 104, and a request for the total parking fee calculated by the transponder 110. These requests are shown at 226, 228, and 230, respectively. If the information received by the central computer 104 indicates proper payment through debiting in the transponder 110, the exit transceiver provides a signal releasing the vehicle through the exit gate and instructing transponder 110 to erase the entry time and elapsed time information in its memory. In response to the received message packets from the exit transceiver 108, the transponder 110 transmits the requested information to the central management computer 104, via the exit transceiver 108. As block 238 indicates, the central management computer 104 uses the vehicle identification code to update an inventory record to accurately reflect which vehicles remain in the facility 102.

As illustrated in FIG. 2 at block 232 in communications group 206, according to one preferred embodiment, the central management computer 104 can poll the vehicle transponder 110 during the period the vehicle 112 is parked in the facility 102. According to one embodiment, the central management computer 104 performs this polling by way of the transceivers 106 and 108. According to another embodiment, the central management computer 104 performs the polling via additional transceivers 126 and 128, spaced apart from each other within the facility 102. As shown at 234, by polling the vehicle transponder 110, the central management computer 104 can periodically update an inventory record of vehicles present in the facility 102. As illustrated at 236, it can also determine if any vehicles have depleted their internally stored parking credit account, and in response to such a determination, signal a facility attendant to take appropriate action.

Figure 3:
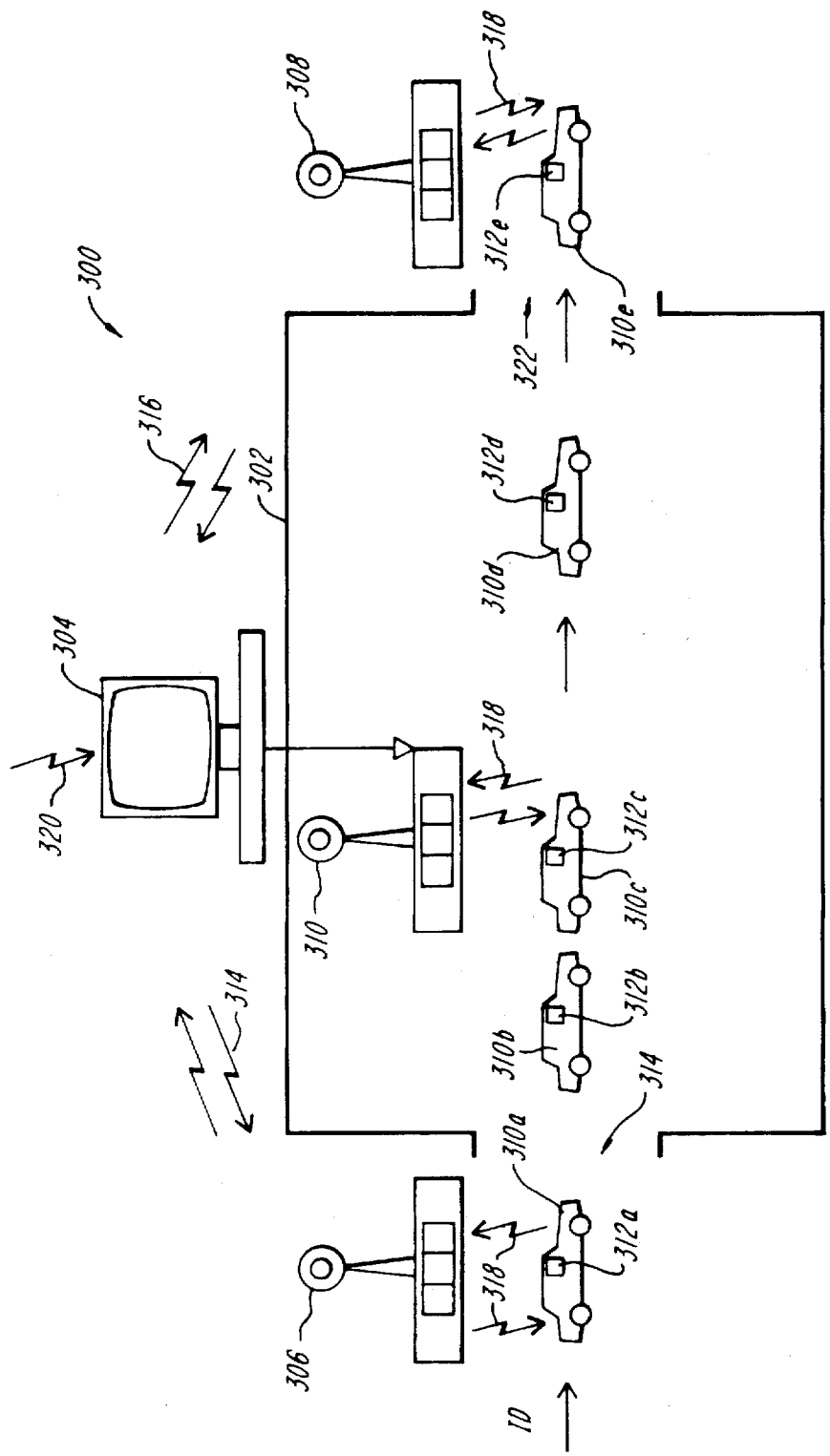
FIG. 3 is a schematic block diagram of a taxicab queuing and dispatching system according to the invention.

FIG. 3 shows a block diagram of one embodiment of a system 300, according to the invention, particularly adapted for queuing and dispatching taxicabs from a corral area 302. Similarly to the system of FIG. 1, the system 300 includes a central management computer 304, an entrance transceiver 306, an exit transceiver 308, a corral area transceiver 310, and vehicle borne transponder units 312a–312e.

The central management computer 304 communicates with the entrance transceiver 306 over a bidirectional radio communication channel 314, and with the exit transceiver 308 over a bidirectional radio frequency channel 316. Each taxicab 310a–310e, utilizing the queuing corral 302, carries a vehicle transponder 312a–312e, respectively. The vehicle transponders 312a–312e communicate with the transceiver units 306, 308, and 310 over a bidirectional radio frequency channel 318. As in the system of FIG. 2, the transceiver units 306 and 308 can relay communications between the central management computer 304 and the vehicle transponders 312a–312e.

Figure 4:
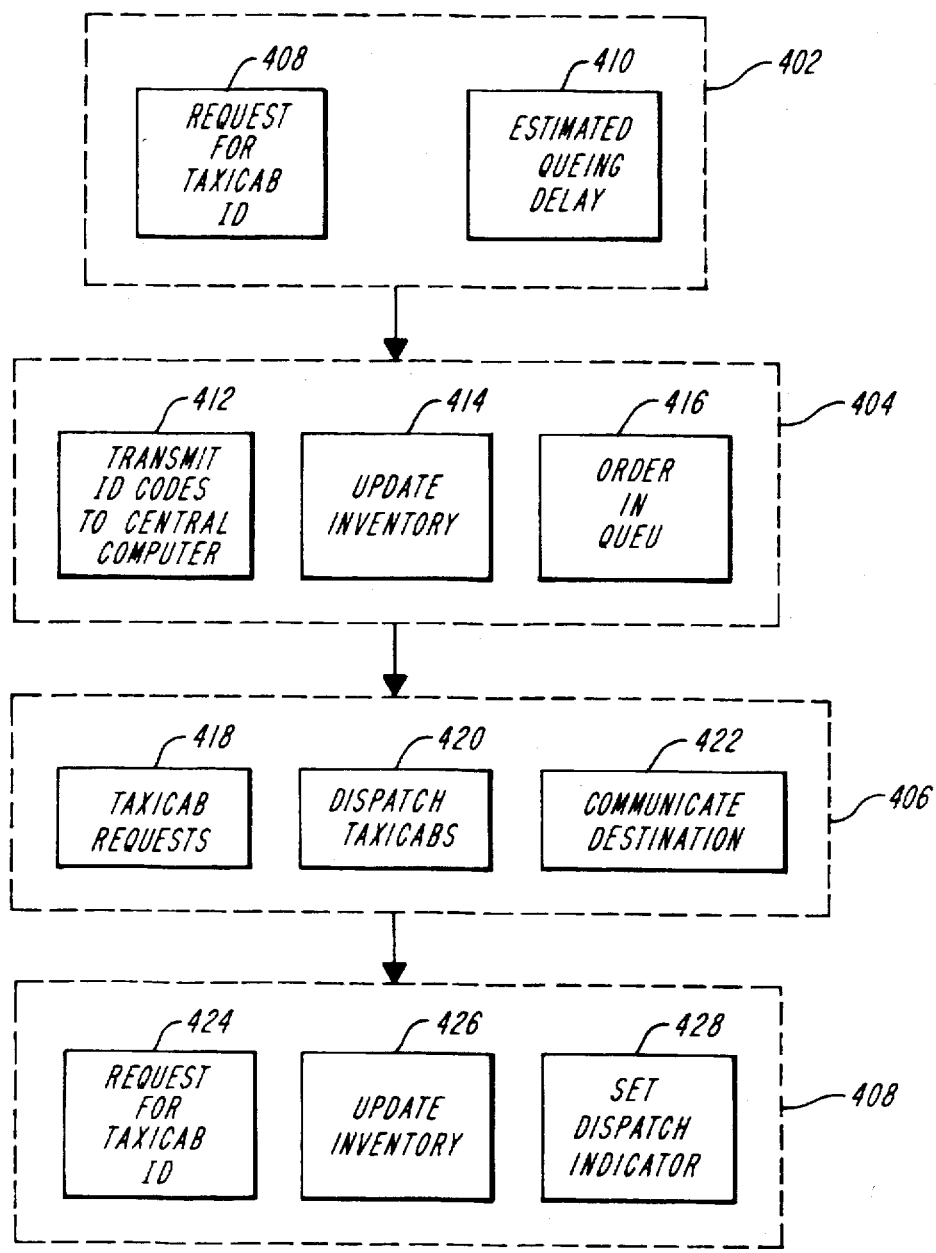
FIG. 4 shows a flow diagram depicting the operation of the system of FIG. 3.

FIG. 4 is a schematic flow diagram depicting the operation of the taxicab queuing and dispatching system of FIG. 3. A system, such as the one depicted in FIGS. 3 and 4 can be used, for example, in an airport setting for dispatching taxicabs to various remote locations, such as airline terminals, in response to requests from attendants at those remote locations. As shown in FIG. 4 in this particular embodiment, taxicabs which utilize the queuing system 300 pass through four phases of operation: awaiting entrance into the corral area 302, shown at 402; entering the corral area 302, depicted at 404; waiting in the corral area 302, illustrated at 406; and exiting the corral area 302, shown at 408.

As each of the vehicle borne transponders 312a–312e approach the entrance 314 of the corral area 302, it enters the radio field radiated by the transmitter portion of the entrance transceiver 306. Upon entering this radio field, each of the transponders 312a–312e receives and decodes information packets from the transceiver 306. These information packets, as indicated at 408, can include requests for information, such as a request for a unique taxicab identification code. As indicated at 410, the information packet can also include information such as an estimate of the queuing delay; this delay being measured from the time a taxicab enters the corral 302 to the time that taxicab exits the corral 302. According to one embodiment, the transponders 312a–312e display the queuing delay information to the taxicab operator, via a visual display, included in each transponder 312a–312e subsequent to the transponders 312a–312b signaling the taxicab identification code to the entrance transceivers 306, the entrance transceiver 306 signals an electronically controlled gate 320 to open to enable the taxicabs 310a–310e to enter the corral area 302.

As shown at 404, as the taxicabs 310a–310e enter the corral 302, the system 300 performs various operations. For example, as depicted at 412, the entrance transceiver 306, transmits the identification codes of the entering taxicabs to the central management computer 304. As indicated at 414, the computer 304 responds by updating an inventory of the taxicabs 310a–310e remaining in the corral area 302.

The central management computer 304 tracks the order in which the taxicabs 312a–312e enter the corral area 302. According to one embodiment, the central management computer 302 periodically signals to each taxicab operator, by way of the transceiver 310 and the transponder visual display, how many of the taxicab operators, presently in the corral, entered before that driver. As illustrated at 414, this signaling begins as the taxicabs 310a–310e enter the corral 302.

As shown at 406, the system 300 performs a plurality of functions while the taxicabs 310a–310e are in the corral area 302. For example, as indicated at 418, the central management computer 304 receives requests for taxicabs from attendants at remote locations, via a communications channel 320. As indicated at 420, the central computer 304 responds to these requests by dispatching taxicabs out of the corral area 302, in the order in which they entered. The central management computer 304 dispatches the taxicabs 310a–310e by signaling the taxicab operators, by way of the transceiver 310 and an audio interface and visual display included in each transponder 310a–310e. As illustrated at 422, the transponder of the dispatched taxicab displays the remote location to which the taxicab has been dispatched. In response, the taxicab operator proceeds to the corral area exit 322.

During the exiting phase, the system 300 performs various operations. In response from a request from the exit transceiver 308, the exiting transponder communicates the identification code of the exiting taxicab. This is shown at 424. As indicated at 426, the central management computer 304 utilizes this information to verify that the exiting taxicab has actually been dispatched, and to update an inventory of taxicabs remaining in the corral area 302. As illustrated at 428, the exit transceiver, following the verification by the central management computer 304, sets an indicator on the transponder display to show that the taxicab has been dispatched from the corral. When the taxicab arrives at the remote destination, an attendant can inspect the transponder display to verify that the taxicab has been legitimately dispatched in response to his request. The driver can then reset the indicator by way of the transponder key pad.

While the above discussion has focused on embodiments of the invention particularly adapted for parking facility management and taxicab dispatching, those skilled in the art will appreciate that the invention can be practiced with respect to vehicle access to any restricted access area. Examples included military installations, employee and student parking facilities, and gated parking communities.

Figure 5:
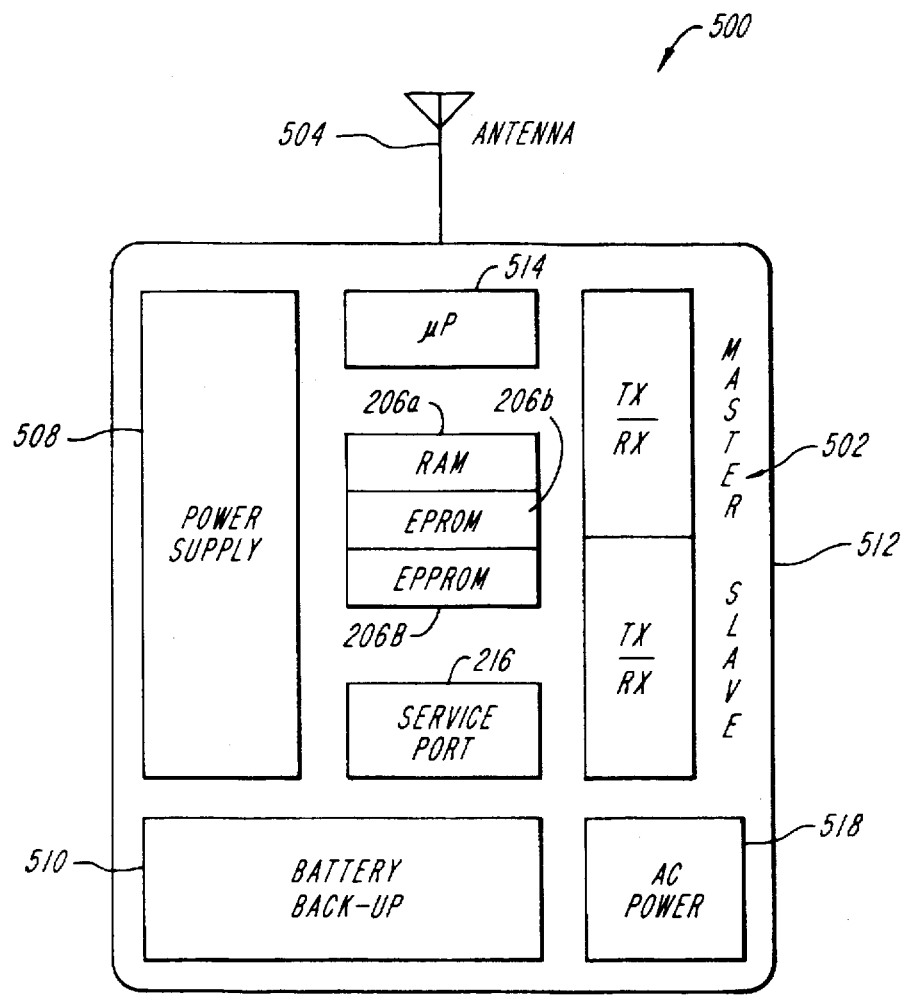
FIG. 5 is a simplified block diagram of a base transceiver unit of the type depicted in FIGS. 1 and 3 and constructed in accordance with the invention.

FIG. 5 shows a block diagram of a base transceiver unit 500 of the type depicted in FIGS. 1 and 3, and constructed in accordance with the invention. Those skilled in the art will appreciate that while the illustrated transceiver utilizes radio frequency signal generating elements, the invention can also be practiced in connection with transceiver components utilizing infrared (IR) or other radiant electromagnetic energy wavelengths.

As discussed above, the base transceivers repeatedly emit an encoded signal that provides the vehicle transponders with information regarding access to the access restricted area, such as the parking facility 102 of FIG. 1 and the corral area 302 of FIG. 3. The format of the particular communications is discussed below.

Each of the illustrated base transceivers units 500 may include a conventional master/slave transmitter and receiver elements 502; an antenna element 504; a memory element 506, including a random access memory (RAM) 506a, an electrically programmable read only memory (EPROM) 506b, and an erasable electrically programmable read only memory (EEPROM) 506c; a power supply element 508; a back-up battery 510; a microprocessor element 514; a service port 516; and an AC power supply element 518. These components are conventional in design and materials, and the transmitter and receiver elements can be constructed in accordance with known engineering practices. The complete transceiver assembly is preferably enclosed in a rugged weatherproof housing 512, to withstand the ranges of temperature, humidity, and ultraviolet radiation typical of the outdoor environment. The transceiver 500 can be activated by an infrared or optical vehicle detector, so that the transceiver 502 emits signals only when a vehicle is in proximity to it.

Figure 6:
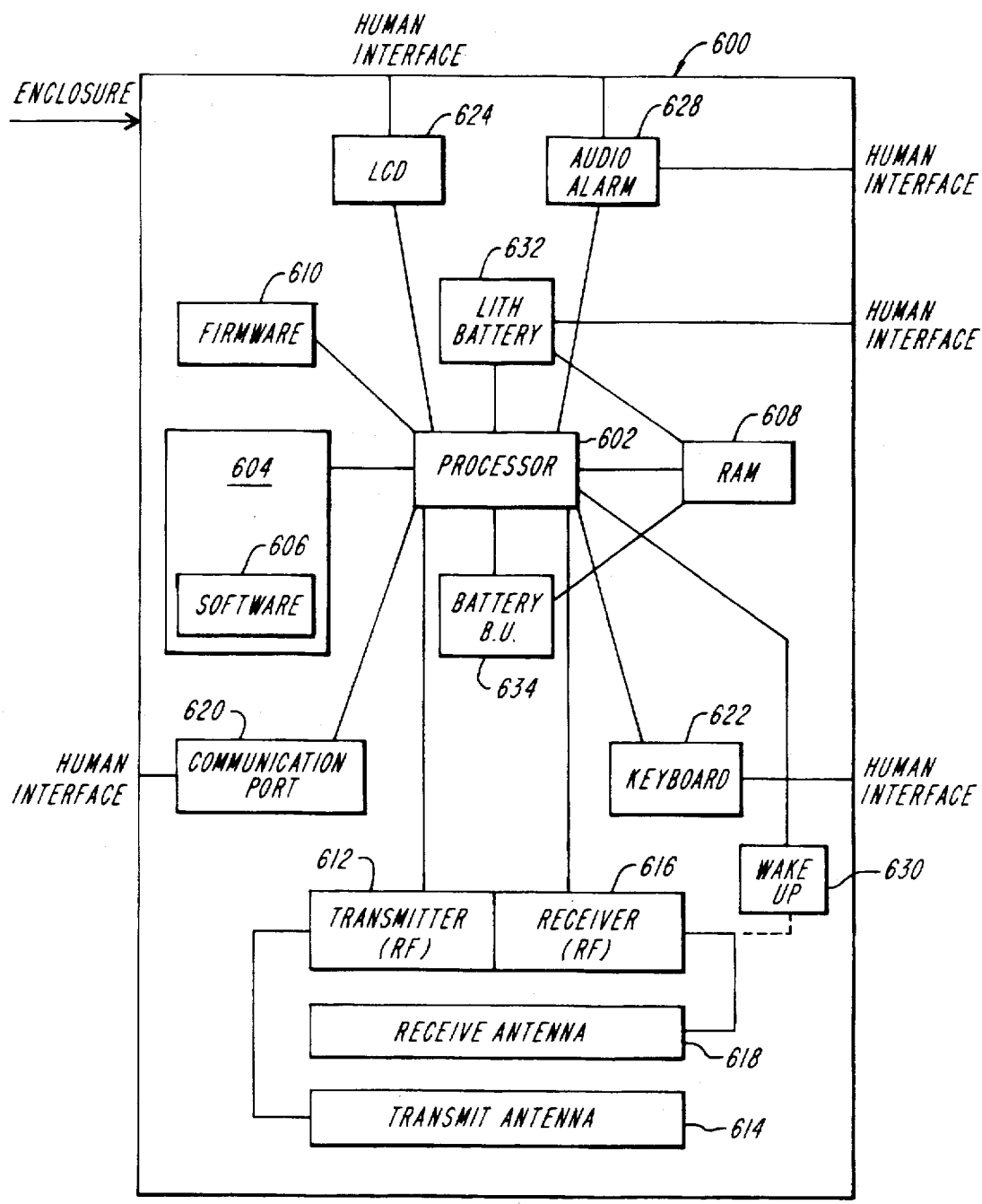
FIG. 6 is a schematic block diagram of a vehicle transponder unit, particularly adapted for operation in the systems of FIGS. 1 and 3.

FIG. 6 is a schematic block diagram of a vehicle transponder 600, particularly adapted for operation in the systems depicted in FIGS. 1 and 3. The vehicle transponder 600 includes a processing element 602, an associated EPROM 604 for storing control software 606, a CMOS RAM element 608 for storing information collected from transceiver units of the type depicted in FIGS. 1, 3, and 5, control firmware 610, an RF transmitter 612, and associated antenna module 614, an RF receiver 616 and an associated antenna 618, user interface elements 622, 624, and 628, a bi-directional communications port 620 and a vehicle transponder wake-up element 630 for signaling the vehicle transponder that an incoming transmission is beginning.

The processing element 602 can be an 8086 or other microprocessor capable of executing the calculations necessary to process the collected traffic information. The microprocessor also controls decoding an interpretation of encoded communication signals received from roadway transceivers. The RAM element 608 preferably provides sufficient storage to store the information collected from the base transceivers of the type depicted in FIGS. 1, 3, and 5.

The vehicle transponder antennas 614 and 618 can be incorporated into the vehicle transponder, or a receptacle can be provided to attach a conventional window-mounted antenna, similar to those employed in connection with cellular telephones.

The user interface elements preferably include user operable keys 622, LCD or LED display units 624 and an audio speech synthesis module 628. The display and audio elements provide visual and audio information, such as instructions to proceed to an alternate route or to proceed to a particular toll collection lane. As previously discussed, such instructions usually originate at the central management computer and are relayed to the vehicle transponders by way of the roadway transceiver units. The display 624 and user interface keys 622 in combination with conventional EPROM-stored software routines 606 for controlling the microprocessor 602, enable the user to view information collected by the vehicle transponder and also to enter other information, such as the estimated length of stay in the restricted access area, as requested by base transceiver units. According to one embodiment, the user interface includes an alphanumeric display having two lines of ten characters each.

The bidirectional communication port 320 enables other microprocessors to write data into and read data out of the vehicle transponder RAM 608.

The power supply elements preferably include a compact, user-replaceable long-life battery 622, such as a lithium power cell. The power supply also includes a battery backup 634 so that the RAM 608 is not cleared during replacement of the lithium cell 632.

The vehicle transponder components, depicted in FIG. 6, are conventional in design and construction, and the vehicle transponder can be constructed in accordance with known transponder and microprocessor control principles. The illustrated vehicle transponder/processor 600 can be housed in a compact, portable enclosure adapted for removable attachment to a dashboard surface or other convenient location within the vehicle.

As previously mentioned, the vehicle transponder receiver 616 decodes, and stores signals transmitted at the base transceiver units. The vehicle transponder processor 600 also interprets the received signals and in response either collects data specified by the signals, transmits information back to the interrogating transceiver, or signals the vehicle operator, via the audio/visual interface, to take a specified action.

Information packets transmitted and received by the vehicle transponder processor 600 can be flexibly configured with or without a fixed length. Additionally, the packets can incorporate an encrypted synchronization portion, a transaction portion, and a check sum portion. According to the invention, the communication format can be modified to suit particular applications.

According to one preferred embodiment, information packets are transmitted in the form:

SYNC/TT/DATA/CK SUM

SYNC denotes an encrypted synchronization field to indicate that a message is about to begin and that message is from a device which is allowed access to the vehicle transponder. TT is a binary code identifying the type of data field included in the packet. DATA is a substantive portion of the information packet, requests for transmission, messages to be displayed to the vehicle operator, or requests to collect certain types of data. CK SUM represents error detection codes used to ensure transmission fidelity.

Examples of DATA filed include:
DTS
IDENTIFICATION
MESSAGE
DISPLAY

DTS is a current date and time stamp. It can be included in either a transmission from a roadway transceiver to a vehicle transponder or from a vehicle transponder to a roadside transceiver. IDENTIFICATION is a code, transmitted from a base transceiver, and indicative of the particular parking facility. MESSAGE is a data field, transmitted from a base transceiver, containing a message for the vehicle operator. The vehicle transponder alerts the operator as to the message by activating one or both of the audio and visual user interfaces.

While the above discussion describes the invention in terms of an illustrative hardware embodiment, those skilled in the art will appreciate that a method of automatically monitoring vehicle access to an access restricted area, according to the invention, can be operative with a plurality of alternate hardware embodiments.

It will thus be seen that the invention efficiently attains the objects set forth above, among those made apparent from the preceding discussion. In particular, the invention provides method and apparatus for providing an automated system for controlling vehicle access to restricted access areas such as, commercial parking facilities, military installations, gated communities, and employee parking lots, and educational institutions. Further, the invention provides an automated system for dispatching taxicabs from a queuing area.

It will be understood that changes may be made in the above construction and in the foregoing sequences of operation without departing from the scope of the invention. The illustrated radio frequency transmitters, for example, may be replaced by infrared transmitters or emitters operating in other regions of the electromagnetic spectrum. Moreover, the invention can be practiced in connection with railway or waterway vehicles.

It is accordingly intended that all matter contained in the above description or shown in the accompanying drawings be interpreted as illustrative rather than in a limiting sense.

Having described the invention, what is claimed as new and secured by the Letters Patent is:

I claim:

1. A system for monitoring and managing vehicle access to a restricted access area comprising, a base transceiver including means for repeatedly transmitting radio frequency signals toward vehicles utilizing said area, said signals including information signals including a current date and time, and a fee rate schedule, a plurality of vehicle transponders, each of said transponders having an associated identification code and being located in a vehicle requiring access to said restricted access area, each of said vehicle transponders including a vehicle data processor, a vehicle memory, a vehicle transceiver, and means for intercoupling said data processor, said memory and said vehicle transceiver so that said information signals transmitted from said base transceiver can be received, and processed in said vehicle data processor and at least a subset of said information signals can be stored in said vehicle memory in at least one of, received and processed form, said vehicle memory including means for storing a parking credits signal representative of a monetary quantity available for paying any fees associated with entering into and remaining in said restricted access area, and said vehicle data processor including, means for tracking an elapsed time that said vehicle is within said restricted access area, said time being in relation to said current date and time received from said base transceiver, means for calculating a usage fee based on said fee rate schedule and said elapsed time and for periodically debiting said parking credits signal to reflect said fee, said vehicle transceiver including means for transmitting an information signal to said base transceiver including a signal representing said transponder identification code, and independent data processor means coupled to said base transceiver for two-way communication with said base transceiver.

2. A system in accordance with claim 1 in which said apparatus includes one said base transceiver positioned at an entrance location providing an entrance to said restricted access area and one said base transceiver positioned at an exit location providing an exit to said restricted access area.

3. A system in accordance with claim 1 in which said vehicle transponder includes means for detecting when said vehicle is exiting said restricted access area.

4. A system in accordance with claim 3 in which said vehicle processor includes means for determining a usage fee upon exiting said restricted access area, based on said fee schedule, and for debiting said parking credits signal accordingly.

5. A system in accordance with claim 1 in which said vehicle transceiver includes means for signaling said base transceiver when said vehicle is exiting said restricted access area.

6. A system in accordance with claim 1 in which said vehicle processor includes means for calculating said usage fee a last time, upon exiting said restricted access area, based on said elapsed time and said fee schedule, and for debiting said parking credits signal accordingly.

7. A system in accordance with claim 1 in which said independent data processor means includes polling means for polling particular vehicles in said restricted access area, via said base transceiver, to determine for each said particular vehicle a current quantity of parking credits available to pay said fee.

8. A system in accordance with claim 7 in which said independent processor includes means for alerting an attendant if said monetary quantity becomes negative.

9. A system in accordance with claim 1 in which said vehicle processor means includes means for storing in said vehicle memory means a running total of said fee charged, and said transponder means includes display means for displaying to a vehicle operator at least one of a present quantity of parking credits and said running total.

10. A system in accordance with claim 1 in which said apparatus includes gating means, electronically coupled to and controlled by said independent processor means, for stopping vehicles, having an insufficient number of parking credits available, from entering said restricted access area.

11. A system in accordance with claim 1 in which said apparatus includes gating means, electronically coupled to and controlled by said independent processor means, for stopping vehicles, having an insufficient number of parking credits available, from exiting said restricted access area.

12. A system in accordance with claim 1 in which said base transceiver transmitted radio frequency signals include an information signal representing a request for estimated length of stay, and wherein said vehicle transponder includes display means for displaying said request for estimated time of stay to a vehicle operator, and operator input means for entering an estimated time of stay for transmitting by way of said vehicle transceiver and said base transceiver to said independent processor means.

13. A system in accordance with claim 12 in which said independent processor means includes means for transmitting a location message to said vehicle transponder, by way of said base transceiver, in response to said estimated time of stay, said position message indicating to said operator a particular portion of said restricted access area to park said vehicle.

14. A system in accordance with claim 13 in which said vehicle transponder means includes display means for displaying said location message to said vehicle operator.

15. A method for monitoring and managing vehicle access to a restricted access area comprising the steps of, prior to said vehicle accessing said restricted access area storing in said vehicle transponder a parking credits signal representative of a monetary quantity available for paying any fees associated with entering into and remaining within said restricted access area, repeatedly transmitting radio frequency signals toward vehicles accessing said restricted access area from a base transceiver, said radio frequency signals including information signals indicating a current date and time, and a fee rate schedule, receiving said transmitted radio frequency signal at a vehicle receiver carried by a vehicle responder in at least one of a plurality of vehicles accessing said restricted access area, processing at said vehicle responder said received signals to identify said message transmitted from said base transceiver, storing at said vehicle responder at least one of said received or processed signals in a memory in said vehicle, tracking at said vehicle responder the elapsed time that said vehicle is within said restricted access area, said elapsed time being determined in relation to said received current date and time, calculating from said received fee rate schedule and said elapsed time a usage fee, periodically debiting said parking credits signal to reflect said calculated usage fee.

* * * * *